United States Patent [19]

Miller et al.

[11] Patent Number: 5,066,835
[45] Date of Patent: Nov. 19, 1991

[54] SENSING EDGE

[75] Inventors: Norman K. Miller; Bearge D. Miller, both of Concordville, Pa.

[73] Assignee: Miller Edge, Inc., Concordville, Pa.

[21] Appl. No.: 585,332

[22] Filed: Sep. 19, 1990

[51] Int. Cl.⁵ .............................................. H01H 3/16
[52] U.S. Cl. ................................................ 200/61.43
[58] Field of Search ............. 200/61.43, 61.62, 85 R, 200/86 R, 86 A

[56] References Cited

U.S. PATENT DOCUMENTS

| | | | |
|---|---|---|---|
| 2,843,690 | 7/1958 | Miller | 200/61.43 |
| 3,243,540 | 1/1963 | Miller | 200/86 |
| 3,315,050 | 4/1966 | Miller | 200/61.43 |
| 3,321,592 | 7/1966 | Miller | 200/61.43 |
| 3,462,885 | 10/1967 | Miller | 49/488 |
| 3,754,176 | 8/1973 | Miller | 318/266 |
| 3,812,313 | 5/1974 | Wolf et al. | 200/86 R |
| 3,867,595 | 2/1975 | Ramsey et al. | 200/86 R |
| 4,137,116 | 1/1979 | Miller | 156/269 |
| 4,200,777 | 4/1980 | Miller | 200/85 A |
| 4,349,710 | 9/1982 | Miller | 200/61.43 |
| 4,362,911 | 12/1982 | Sears et al. | 200/5 A |
| 4,396,814 | 8/1983 | Miller | 200/61.43 |
| 4,401,896 | 8/1983 | Fowler et al. | 307/118 |
| 4,497,989 | 2/1985 | Miller | 200/86 R |
| 4,661,664 | 4/1987 | Miller | 200/86 R |
| 4,684,768 | 8/1987 | Sackmann et al. | 200/61.43 |
| 4,773,155 | 9/1988 | Buchien | 29/622 |
| 4,785,143 | 11/1988 | Miller | 200/61.43 |
| 4,908,483 | 3/1990 | Miller | 200/61.43 |
| 4,920,241 | 4/1990 | Miller | 200/86 R |
| 4,954,673 | 9/1990 | Miller | 200/61.43 |

*Primary Examiner*—J. R. Scott
*Attorney, Agent, or Firm*—Panitch Schwarze Jacobs & Nadel

[57] ABSTRACT

A sensing edge having increased sensitivity is disclosed. The sensing edge is for causing a closing door to open by actuation of a device upon force being applied to the sensing edge. The sensing edge comprises a compressible outer sheath having a grooved wall surface and at least a portion of a switch assembly positioned within the sheath. The grooved wall surface renders the sheath more easily compressible thereby increasing the sensitivity of the sensing edge.

9 Claims, 1 Drawing Sheet

SENSING EDGE

FIELD OF THE INVENTION

The present invention relates to a sensing edge for a door and more particularly, to a sensing edge for a door that includes a device that is actuated by a force applied to the sensing edge, that will, upon actuation cause a closing door to open.

BACKGROUND OF THE INVENTION

The use of sensing edges on doors is generally known. Sensing edges generally include a sheath having an area therein where at least a portion of a switch means is located. The switch means typically includes a pair of upper and lower, flexible, electrically conductive sheets, such as aluminum foil, positioned on the upper and lower sides of a perforated bridge. Upon application of external pressure to the sheath, the conductive sheets are deflected into electrically conductive engagement with each other through the perforations to thereby function as a switch to actuate suitable door control circuitry. The switch means could also include a fluid pressure sensitive switch element in which electrical contact is made or broken in response to pressure changes.

Generally, in switches of this type, there is required a highly localized deflection to operate the switch. Even a substantial force or weight may not be sufficient to actuate such a switch, if the force or weight is distributed over a large area. In an attempt to overcome this problem, such switches often include internal protrusions for locally enhancing internal forces reacting to an external weight. However, the use of internal protrusions added to the cost of the switch. Such switches were complex to manufacture and required additional raw materials to form the protrusions.

Consequently, a need has arisen for a highly sensitive switch which actuates a device upon a slight force being applied thereto. There further exists a need for a sensing edge which will respond to slight forces applied anywhere along the surface of the sheath, including forces acting on the sides of the sheath. Additionally, a need exists for such a highly sensitive switch which can be easily and readily manufactured without incurring prohibitive manufacturing costs.

The present invention is directed to a sensing edge for causing a closing door to open by actuation of a device upon force being applied to the sensing edge. The sensing edge of the present invention comprises a readily compressible sheath which imparts increased sensitivity to the sensing edge. In comparison to the prior art, device actuation is effected by a lesser force or weight and actuation occurs even where there is a less localized deflection.

SUMMARY OF THE INVENTION

Briefly stated, the present invention comprises a sensing edge for causing a closing door to open. Damage is prevented by actuation of a device upon force being applied to the sensing edge. The sensing edge comprises a sheath compressible upon the application of external pressure anywhere along its surface and fabricated of a flexible material for attachment to a door edge. The sheath includes a wall having an exterior surface and an interior surface, wherein the interior surface at least partially defines an area for receiving at least a portion of a switch means. One of the surfaces of the wall includes a groove which extends toward the other surface and enhances the compressibility of the sheath. The enhanced compressibility results in greater sensitivity of the sensing edge. Actuation of the device is effected upon the application of external pressure to the sheath.

BRIEF DESCRIPTION OF THE DRAWING

The foregoing summary, as well as the detailed description of the preferred embodiment, will be better understood when read in conjunction with the appended drawing. For the purpose of illustrating the invention, there is shown in the drawing an embodiment which is presently preferred, it being understood, however, that the invention is not limited to the specific methods and instrumentalities disclosed. In the drawing.

DETAILED DESCRIPTION OF PREFERRED EMBODIMENT

Figure 1:
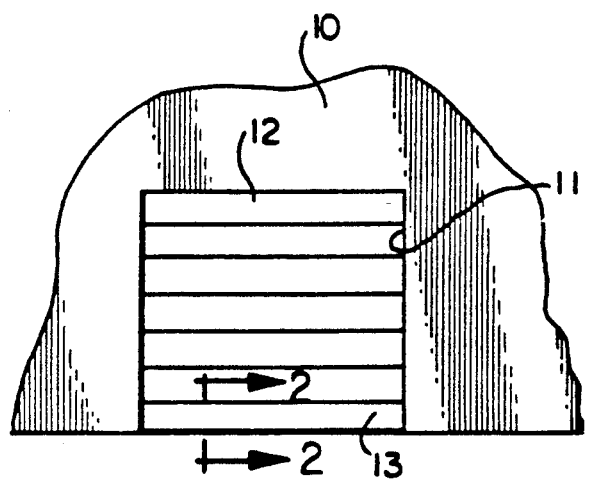
FIG. 1 is a front elevational view showing a door construction including a sensing edge in accordance with the present invention.

Referring to the drawing, wherein like numerals indicate like elements throughout, there is shown in FIG. 1, a building wall 10 having a doorway 11 provided with a door 12. While the door 12, as illustrated, is an overhead door, having a sensing edge 13 in accordance with the present invention along its lower side or leading edge 15, it is within the spirit and scope of the invention to incorporate the sensing edge 13 described hereinafter along the edge of any door structure, such as vertically disposed or horizontally movable doors (not shown), as desired.

Figure 2:
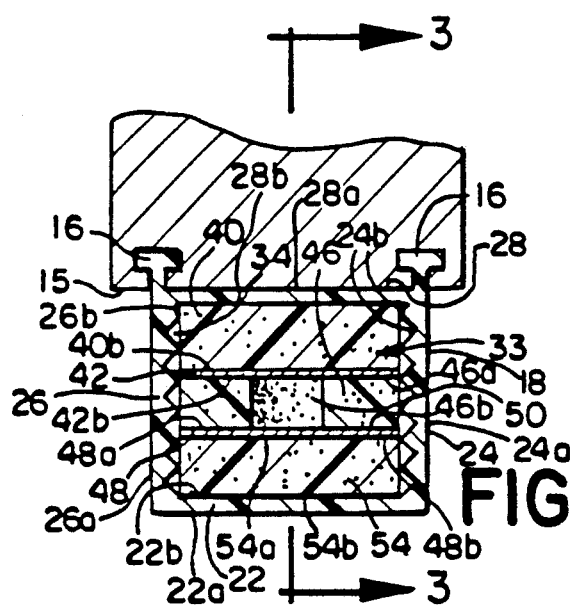
FIG. 2 is a greatly enlarged cross-sectional view of the sensing edge of FIG. 1 taken along line 2—2 of FIG. 1.

Referring now to FIG. 2, the sensing edge 13 extends substantially along the leading edge 15 of the door 12. The sensing edge 13 and the door 12 include securing means for fixing the sensing edge 13 to the leading edge 15 of the door 12. In the presently preferred embodiment, the securing means comprises a pair of T-shaped members 16 which complement T-shaped slots in the lower surface of the door 12, thereby facilitating a quick and easy mounting or removal and replacement of the sensing edge 13 with respect to the door 12. Of course, the sensing edge 13 may be secured to the door 12 in any other suitable manner, for instance, with a traditional dovetail slot configuration (not shown).

The sensing edge 13 is comprised of an outer casing or sheath 18 of an elongate, generally constant cross-sectional outline configuration, extending closely along the leading edge 15 of the door 12. That is, the sheath 18 extends along an axis 19 extending generally parallel to the leading edge 15. In the presently preferred embodiment, the sheath 18 is generally of square cross section, but may be of any other suitable shape, such as circular or semi-circular (not shown).

The sheath 18 is advantageously fabricated of form retaining, but flexible material, such as rubber, such that the sheath 18 is compressible upon the application of external pressure. The sheath 18 has a bottom wall 22 spaced apart from a top wall 28. The bottom wall 22 is for engagement with the door threshold or ground when the door 12 is in the closed position (see FIG. 1).

The sheath 18 further includes a first side wall 24 extending between the bottom wall 22 and the top wall 28. A second side wall 26 also extends between the bottom wall 22 and the top wall 28. The first side wall 24 is preferably spaced apart from the second side wall 26. Both first and second side walls 24, 26 as well as the bottom wall 22 and the top wall 28 have an exterior surface 22a, 24a, 26a, 28a and an interior surface 22b, 24b, 26b, 28b, respectively. The interior surfaces 22b, 24b, 26b, 28b at least partially define an area 33 for receiving at least a portion of a switch means, described hereinafter.

One of the interior or exterior surfaces 24a, 24b, 26a, 26b of the side walls 24, 26 includes a groove 34 therein which extends toward the other of the interior or exterior surfaces 24a, 24b, 26a, 26b to thereby enhance the compressibility of the sheath 18. In the present embodiment, it is preferred that the interior surfaces 24a, 26a of the first and second side walls 24, 26 include a plurality of grooves 34 extending towards the exterior surfaces 24b, 26b, respectively.

It is understood by those skilled in the art, that the present invention is not limited to any particular number of grooves 34 in the first and second side walls 24, 26. It is further understood that the present invention is not limited to locating the grooves 34 in any particular wall of the sheath 18 or in either of the exterior or interior surfaces 24a, 24b, 26a, 26b thereof. For instance, the grooves 34 could be located in the bottom wall 22 along the interior surface 22b. Further, the grooves 34 could be located in both the exterior and interior surfaces 24a, 24b of the second side wall 24 without departing from the spirit and scope of the invention.

In the present embodiment, it is preferred that the grooves 34 extend generally parallel to the axis 19. However, it is understood by those skilled in the art, that the grooves 34 could extend in other directions with respect to the axis 19. For instance, the grooves 34 could extend generally perpendicular to the axis 19 without departing from the spirit and scope of the invention.

Further referring to FIG. 2, it is presently preferred that the grooves 34 be generally V-shaped in cross section. However, it is understood by those skilled in the art that the cross-sectional configuration of the grooves 34 can be of other geometrical shapes, such as semi-circular or square.

Figure 3:
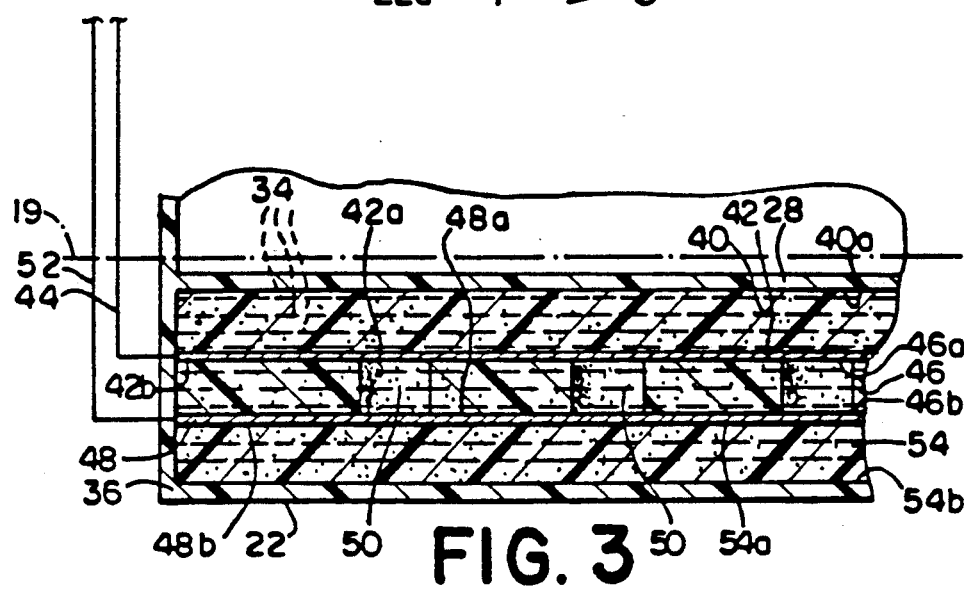
FIG. 3 is a cross-sectional view of the sensing edge of FIG. 2 taken along line 3—3 of FIG. 2.

Now referring to FIGS. 2 and 3, an end wall 36 closes and seals each end of the sheath 18 to thereby further form the area 33 for receiving at least a portion of a switch means for actuation of a device (not shown) upon application of external pressure to the sheath 18. In the presently preferred embodiment, the switch means comprises a first sheet of resiliently compressible material 40 positioned within the area 33 and includes a first face 40a and second face 40b. The first face 40a of the first sheet of resiliently compressible material 40 is in engagement with the interior surface 28b of the top wall 28.

In the present embodiment, it is preferred that the first sheet of the resiliently compressible material 40 and succeeding layers and sheets described hereinafter, be generally sized to complement the internal configuration of the area 33. However, it is understood by those skilled in the art, that the first sheet of resiliently compressible material 40 and succeeding layers and sheets can be sized as wide or narrow as desired, and be of any length for accommodating different structures and uses.

In the present embodiment, it is preferred that the first sheet of resiliently compressible material 40 be constructed of generally soft foam rubber. It is understood by those skilled in the art, that the first sheet of resiliently compressible material 40 can be constructed of either closed or open cell foam rubber or other materials having similar properties.

Just below (when viewing FIGS. 2 and 3) the first sheet of resiliently compressible material 40 is a first sheet of flexible, electrically conductive material 42, engaged therewith, and having a first face 42a and a second face 42b. The first face 42a of the first sheet of flexible, electrically conductive material 42 is in engagement with the second face 40b of the first sheet of resiliently compressible material 40 such that the first face 42a and the second face 42b are in corresponding facing relationship. In the present embodiment, it is preferred that the first sheet of flexible, electrically conductive material 42 be generally thin and preferably be constructed of aluminum or aluminum foil. However, it is within the spirit and scope of the invention to construct the first sheet of flexible, electrically conductive material 42 of other materials, such as copper, brass or an alloy thereof.

As shown in FIG. 3, an electrical conductor or wire 44 is electrically connected to the first sheet of flexible, electrically conductive material 42 preferably by soldering at one end thereof. The electrical conductor 44 is used in connection with a circuit (not shown) for controlling the actuation of the device, as is understood by those skilled in the art, in response to the application of force to the sheath 18, as described hereinafter.

The first sheet of flexible, electrically conductive material 42 is in engagement with a layer of non-conductive material 46 having a first face 46a and a second face 46b for spacing apart the first sheet of flexible, electrically conductive material 42 and a second sheet of flexible, electrically conductive material 48. The layer of non-conductive material 46 has at least one opening extending therethrough between the first and second faces 46a, 46b thereof. As shown in FIG. 3, the layer of non-conductive material 46, preferably includes a plurality of openings 50 interspersed therealong for allowing the actuation of the switch 38 by applying pressure thereto, as described hereinafter. The first face 46a of the layer of nonconductive material 46 is in engagement or corresponding facing relationship with the second face 42b of the first sheet of flexible, electrically conductive material 42.

In the present embodiment, it is preferred that the openings 50 be generally oval-shaped in cross section. However, it is within the spirit and scope of the invention to configure the openings 50 of any geometric shape, such as square or circular.

The layer of non-conductive material 46 is preferably constructed of generally soft foam rubber. It is understood by those skilled in the art, that the layer of non-conductive material 46 can be constructed of either closed or open cell foam rubber or other materials having similar properties, so long as the function of the switch 38 is achieved, as described hereinafter.

The layer of non-conductive material 46 is in engagement with a second sheet of flexible, electrically conductive material 48 having a first face 48a and a second face 48b. The first face 48a of the second sheet of flexible, electrically conductive material 48 is in engagement or corresponding facing relationship with the second face 46b of the layer of non-conductive material 46.

In the present embodiment, it is preferred that the second sheet of flexible, electrically conductive material 48 be constructed of the same material and configuration as the first sheet of flexible, electrically conductive material 42. Similarly, the second sheet of flexible, electrically conductive material 48 is connected to an electrical conductor or wire 52 for connection with the circuit for controlling the actuation of the device in response to the application of force to the sheath 18.

In engagement with the second sheet of flexible, electrically conductive material 48 is a second sheet of resiliently compressible material 54 having a first face 54a and a second face 54b. The first face 54a of the second sheet of resiliently compressible material 54 is in engagement or corresponding facing relationship with the second face 48b of the second sheet of flexible, electrically conductive material 48. The second face 54b of the second sheet of resiliently compressible material 54 is in engagement with the bottom wall 22 of the sheath 18.

The second sheet of resiliently compressible material 54 is preferably constructed of the same material and configured generally identically to the first sheet of resiliently compressible material 40. However, it is apparent to those skilled in the art, that the first and second sheets of resiliently compressible material 40, 54 can differ in configuration, size and/or material.

As shown in FIG. 3, the first and second sheets of flexible, electrically conductive material 42, 48 are spaced apart by the layer of nonconductive material 46 and present opposed portions to each other through the openings 50. Upon the application of force to the sheath 18, a portion of at least one of the first and second sheets of flexible, electrically conductive material 42, 48 deflects into at least one of the openings 50 in the layer of non-conductive material 46, and makes electrical contact between the first and second sheets of flexible, electrically conductive material 42, 48 to thereby actuate the device.

It is understood by those skilled in the art, that a number of equivalent switches can be used in the sensing edge without departing from the spirit and scope of the invention. Examples of such equivalent switches include a pressure sensitive switch as disclosed in U.S. Pat. No. 4,908,483 and a high sensitivity door edge switch as disclosed in U.S. Pat. No. 4,920,241 both of which are hereby incorporated by reference.

In operation, the electrical conductors or wires 44, 52 are connected to a circuit (not shown) for controlling the actuation of a device (not shown) and/or for controlling the operation of the door 12 in response to the application of force to the sheath 18. Specifically, upon the application of force to the exterior surface 22a of the bottom wall 22 of the sheath 18, a portion of at least one of the first and second sheets of flexible, electrically conductive material 42, 48 deflects into at least one of the openings 50 in the layer of non-conductive material 46 and makes electrical contact between the first and second sheets of flexible, electrically conductive material 42, 48 to thereby complete or enable the circuit to actuate the device and/or control the operation of the door 12.

The presence of one or more grooves 34 in the interior surfaces 24b, 26b of side walls 24, 26 increases the compressibility of the sheath 18. This increased compressibility renders the sheath 18 more sensitive to the application of force. Accordingly, the sensing edge 13 of the invention requires less force for device actuation than conventional sensing edges.

From the foregoing description, it can be seen that the present invention comprises a sensing edge for causing a closing door to open by actuation of a device upon force being applied to the sensing edge. The presence of one or more grooves in the sheath of the sensing edge of the invention enhances the compressibility of the sheath making the sensing edge more sensitive. It is appreciated by those skilled in the art, that changes could be made to the embodiment described above without departing from the broad inventive concepts thereof. It is understood, therefore, that this invention is not limited to the particular embodiment disclosed, but is intended to cover all modifications which are within the scope and spirit of the invention as defined by the appended claims.

We claim:

1. A sensing edge for causing a closing door to open by actuation of a device upon force being applied to the sensing edge, the sensing edge comprising:

a sheath compressible upon the application of external pressure anywhere along its surface and fabricated of a flexible material for attachment to a door edge, the sheath including a top wall and a non-linear wall each wall having an exterior surface and an interior surface, the interior surfaces of said top and non-linear walls at least partially defining an area for receiving at least a portion of a switch means, one of the surfaces of the non-linear wall including a groove therein extending toward the other of the surfaces of the non-linear wall to provide an area of reduced wall thickness to thereby enhance the compressibility of the sheath; and at least a portion of a switch means positioned within the area for actuation of the device upon application of external pressure to the sheath, whereby the groove increases the sensitivity of the sensing edge.

2. The sensing edge of claim 1, wherein the interior surface of the wall includes at least one groove formed therein.

3. The sensing edge of claim 1, wherein the sheath is generally elongate and extends along an axis extending generally parallel to the door edge, the groove extending generally parallel to the axis.

4. The sensing edge of claim 1, wherein the groove is generally V-shaped in cross section.

5. The sensing edge of claim 1, wherein the interior surface of the wall includes a plurality of grooves.

6. A sensing edge for causing a closing door to open by actuation of a device upon force being applied to the sensing edge, the sensing edge comprising:

a sheath compressible upon the application of external pressure and fabricated of a flexible material for attachment to a door edge, the sheath having a bottom wall spaced apart from a top wall, a first side wall extending between the bottom wall and the top wall, a second side wall extending between the bottom wall and the top wall, the first side wall being spaced apart from the second side wall, each of the walls including an interior surface and an exterior surface such that the interior surface of the walls at least partially defines an area for receiving at least a portion of a switch means, one of the surfaces of the side walls including a groove therein extending toward the other of the surfaces to thereby enhance the compressibility of the sheath; and at least a portion of a switch means positioned within the area for actuation of the device upon application of external pressure to the sheath whereby at least one groove in the first and second side walls increases the sensitivity of the sensing edge.

7. The sensing edge of claim 6, wherein the bottom wall includes at least one groove in the interior surface.

8. A sensing edge for causing a closing door to open by actuation of a device upon force being applied to the sensing edge, the sensing edge comprising:

a sheath compressible upon application of external pressure and fabricated of flexible material for attachment to a door edge, the sheath having a bottom wall spaced apart from a top wall, a first side wall extending between the bottom wall and the top wall, a second side wall extending between the bottom wall and the top wall, the first side wall being spaced apart from the second side wall, each of the walls including an interior surface and an exterior surface such that the interior surface of the walls defines an area for receiving a portion of a switch means, the first and second side walls including at least one groove in the interior surface thereof extending towards the exterior surface to thereby increase the compressibility of the sheath; and a switch means positioned within the area for actuation of a device upon application of external pressure to the sheath, the switch comprising:

a first sheet of resiliently compressible material having a first face and a second face, the first face of the first sheet of resiliently compressible material being in engagement with the interior surface of the top wall;

a first sheet of flexible, electrically conductive material having a first face and a second face, the first face of the first sheet of flexible, electrically conductive material being in engagement with the second face of the first sheet of resiliently compressible material;

a layer of non-conductive material having a first face and a second face, the first face of the layer of non-conductive material being in engagement with the second face of the first sheet of flexible, electrically conductive material, the layer of non-conductive material including at least one opening extending therethrough between the first and second faces thereof;

a second sheet of flexible, electrically conductive material having a first face and a second face, the first face of the second sheet of flexible, electrically conductive material being in engagement with the second face of the layer of non-conductive material;

a second sheet of resiliently compressible material having a first face and a second face, the first face of the second sheet of resiliently compressible material being in engagement with the second face of the second sheet of flexible, electrically conductive material, the second face of the second sheet of resiliently compressible material being in engagement with the interior surface of the bottom wall, the first and second sheets of flexible, electrically conductive material being spaced apart by the layer of non-conductive material and present opposed portions to each other through the opening whereby upon the application of force to the bottom wall of the sheath, a portion of at least one of the first and second sheets of flexible, electrically conductive material deflects into the opening in the layer of non-conductive material and makes electrical contact between the first and second sheets of flexible, electrically conductive material to thereby actuate the device.

9. A sensing edge for causing a closing door to open by actuation of a device upon force being applied to the sensing edge, the sensing edge comprising:

a sheath compressible upon the application of external pressure and fabricated of a flexible material for attachment to a door edge, the sheath having a bottom wall spaced apart from a top wall, a first side wall extending between the bottom wall and the top wall, a second side wall extending between the bottom wall and the top wall, the first side wall being spaced apart from the second side wall, each of the walls including an interior surface and an exterior surface such that the interior surfaces of the walls at least partially define an area for receiving at least a portion of a switch means, one of the surfaces of at least one of the side or bottom walls including a groove therein extending toward the other of the surfaces of the at least one wall to provide an area of reduced wall thickness to thereby enhance the compressibility of the sheath; and at least a portion of a switch means positioned within the area for actuation of the device upon application of external pressure to the sheath whereby at least one groove in the walls increases the sensitivity of the sensing edge.

* * * * *